(12) United States Patent
Bohlke et al.

(10) Patent No.: US 9,475,417 B2
(45) Date of Patent: Oct. 25, 2016

(54) CONTAINER RECEIVING APPARATUS FOR A VEHICLE INTERIOR

(71) Applicants: Hartmut Bohlke, Wuppertal (DE);
Juergen Salewski, Duesseldorf (DE);
Wolfgang Sitzler, Wuppertal (DE);
Wolfram Zummack, Troisdorf (DE);
Bogdan Tutelea, Leichlingen (DE);
Andreas Goebbels, Kuerten (DE)

(72) Inventors: Hartmut Bohlke, Wuppertal (DE);
Juergen Salewski, Duesseldorf (DE);
Wolfgang Sitzler, Wuppertal (DE);
Wolfram Zummack, Troisdorf (DE);
Bogdan Tutelea, Leichlingen (DE);
Andreas Goebbels, Kuerten (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/831,331

(22) Filed: Aug. 20, 2015

(65) Prior Publication Data
US 2016/0059761 A1 Mar. 3, 2016

(30) Foreign Application Priority Data
Aug. 27, 2014 (DE) .......................... 10 2014 217 107

(51) Int. Cl.
*B60N 3/00* (2006.01)
*B60N 3/10* (2006.01)
*B60N 2/46* (2006.01)

(52) U.S. Cl.
CPC ............. *B60N 3/102* (2013.01); *B60N 2/4613* (2013.01); *B60N 3/106* (2013.01)

(58) Field of Classification Search
CPC ...... B60N 3/102; B60N 2/4613; B60N 3/106
USPC ................... 296/37.8, 24.34; 297/188.14
See application file for complete search history.

(56) References Cited

U.S. PATENT DOCUMENTS 5,673,891 A * 10/1997 Fujihara ............... B60N 3/106
248/311.2
6,779,769 B1 8/2004 York et al.

FOREIGN PATENT DOCUMENTS

| DE | 103 37 525 A1 | 3/2004 |
| JP | 2007-83928 A | 4/2007 |
| JP | 2010-12888 A | 1/2010 |

OTHER PUBLICATIONS

Examination Report of German Patent Office issued in Application No. 10 2014 217 107.5 dated Apr. 15, 2015 (4 pages).

* cited by examiner

*Primary Examiner* — Joseph D Pape
(74) *Attorney, Agent, or Firm* — Flynn, Thiel, Boutell & Tanis, P.C.

(57) ABSTRACT

Container receiving apparatus for a vehicle interior having an upper supporting frame and a lower support base, the supporting frame being mounted in a receiving housing such that it can be moved linearly between a retracted rest position and an extended receiving position. The support base is mounted for movement between a supporting functional position and a rest position. A blocking device is provided and is active so as to limit movement or force in such a way that the support base is secured in its functional position against unintentional upward pivoting.

9 Claims, 4 Drawing Sheets

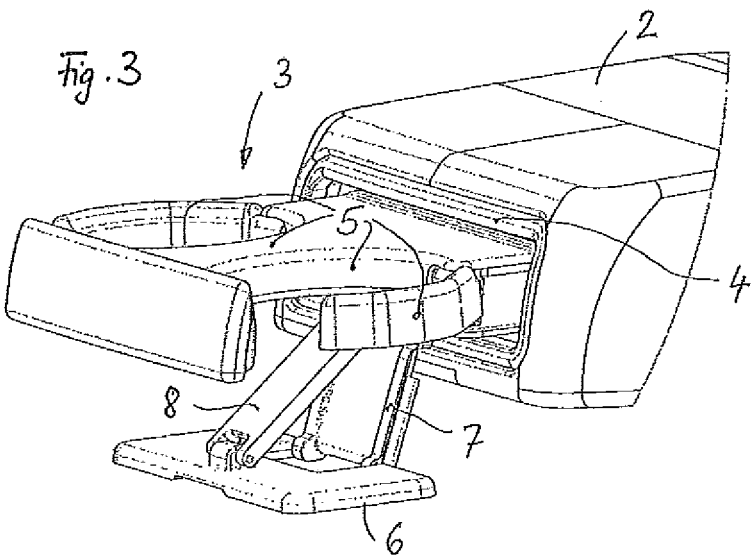
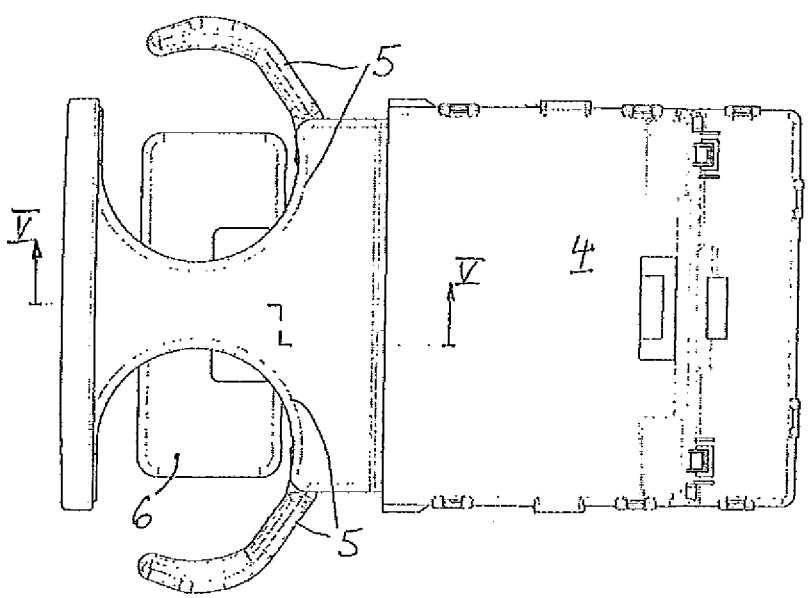

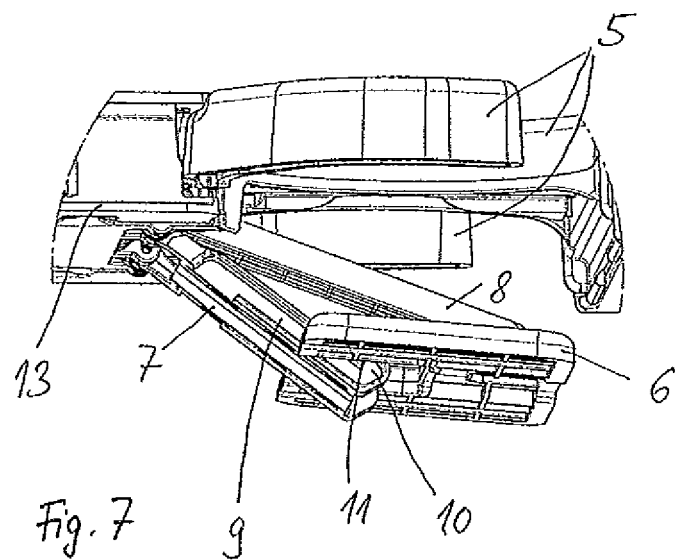

CONTAINER RECEIVING APPARATUS FOR A VEHICLE INTERIOR

CROSS-REFERENCE TO RELATED APPLICATIONS

This claims priority from German patent application DE 10 2014 217 107.5, the disclosure of which is hereby incorporated by reference in its entirety.

FIELD OF THE INVENTION

The invention relates to a container receiving apparatus for a vehicle interior having an upper supporting frame which is provided for lateral support of at least one container, and a lower support base which is provided for bottom-side support of the at least one container, the supporting frame being mounted in a receiving housing such that it can be moved linearly between a retracted rest position and an extended receiving position, and the support base being mounted by means of pivoting kinematics such that it can be moved between a supporting functional position and a rest position which is integrated into the receiving housing.

BACKGROUND OF THE INVENTION

A container receiving apparatus of this type for a vehicle interior is known in general. The container receiving apparatus is integrated into a lowerable center armrest of a rear seat bench and comprises an upper supporting frame and a lower support base. The supporting frame and the support base are arranged recessed in an end side of the center armrest in a rest position. For the functional position, the supporting frame is extended linearly to the front in a horizontally lowered position of the center armrest. At the same time, the support base is moved out via a pivoting kinematics, the support base lowering into a supporting functional position below the supporting frame. If one or two containers are then inserted into the supporting frame from above, they dip through the supporting frame until they are supported on the bottom side on the support base.

SUMMARY OF THE INVENTION

It is an object of the invention to provide a container receiving apparatus of the type mentioned at the outset, the supporting function of which container receiving apparatus is improved for at least one container.

This object is achieved by virtue of the fact that the pivoting kinematics are assigned a blocking means which is active so as to limit movement or force, in such a way that the support base is secured in its functional position against unintentional pivoting up of the support base. The blocking means serves to secure the supporting functional position of the support base. As a result, problems are avoided which could occur in the prior art. An oblique position of the container within the supporting frame could lead to the bottom of the container being displaced on the support base in such a way that a return pivoting movement was imparted to the support base, which return pivoting movement canceled secure support of the container bottom. As a result, a pronounced oblique position of the container and sliding downward of the container beyond the support base could occur, as a result of which liquid could spill out of the container in relatively large quantities. This is avoided by the solution according to the invention, since the support base is additionally secured in its supporting functional position by way of the blocking means. The blocking means is active either so as to limit movement or so as to limit force. The phrase "limit movement" means that the blocking means generates a beyond-dead-center position or a latching position for the pivoting kinematics and the pivoting mobility. "Limit movement" also means that the mobility of the support base is blocked merely in a defined movement direction which occurs as a result of loads from above or from below on the support base, but that said blocking means is at the same time not active in the case of an intentional transfer of the support base and the supporting frame into the rest position. In the case of a blocking means which is active so as to limit force, an increased frictional connection is preferably provided at a defined point in the region of the pivoting kinematics, in order to prevent the undesired movements of the support base in its supporting functional position. However, said additional frictional forces are force-limited in such a way that manual restoring of the support base by an operator is made possible in the case of a desired transfer of the supporting frame and the support base into the rest position. In order to override the force limitation by way of the blocking means, a briefly increased exertion can be required which is selected in such a way, however, that it can be applied without problems by an operator of average strength. The blocking means is advantageously active in a non-positive or positively locking manner. The blocking means can be formed by one or more blocking sections or parts which interact with one another.

In one refinement of the invention, the blocking means comprises at least one latching cam which is integrated into a movement guide of the pivoting kinematics, can be overridden mechanically, and is assigned to the supporting functional position of the support base in the movement guide. The latching cam ensures that the support base cannot be pivoted unintentionally into an oblique position in its supporting functional position.

In a further refinement of the invention, the movement guide is provided with an end-side angled-away portion in a transition region to the functional position for the support base. In a further refinement, the at least one latching cam is assigned to the angled-away portion. The support base itself has at least one sliding block which is displaced in the movement guide. During a transfer of the support base in the direction of the supporting functional position, the sliding block of the support base slides or rolls in the movement guide along the end-side angled-away portion. As soon as the sliding block runs into the angled-away portion, it passes the latching cam, with the result that the latter subsequently forms a rear engagement which is active in a positively locking manner for the sliding block, as soon as the sliding block comes into contact with the end-side edge of the angled-away portion. The latching cam is arranged in such a way that a sliding movement of the sliding block of the support base in the movement guide out of the rest position in the direction of the supporting functional position is not impeded by the latching cam, but that the latching cam blocks a subsequent return movement of the sliding block if the support base is unintentionally pivoted in its supporting functional position.

In a further refinement of the invention, the pivoting kinematics comprise a carrier arm and a control arm which can be moved pivotably parallel to one another and act on the support base at a spacing from one another. The two-arm pivoting kinematics which are formed in this way firstly make secure support of the support base in its functional position possible and secondly permit simple return and pivoting of the support base out of the functional position into a rest position, in which both the support base and the control frame are integrated into a corresponding receiving housing.

In a further refinement of the invention, the movement guide, the angled-away portion and the latching cam are integrated into the control arm. The control arm can have two movement guides, angled-away portions and latching cams which are identical to one another on opposite sides. Accordingly, the support base is also provided with two complementary sliding blocks which engage into the movement guides which lie opposite one another.

In a further refinement of the invention, the latching cam is arranged in such a way that a pivoting movement of the support base relative to the carrier arm is prevented in the functional position of the support base. It is crucial to the invention that the support base does not carry out any undesired pivoting movements relative to the carrier arm in its supporting functional position. The latching cam is therefore arranged in the region of the angled-away portion within the movement guide in such a way that a pivoting movement of this type of the support base in its supporting functional position is not possible.

BRIEF DESCRIPTION OF THE DRAWINGS

Further advantages and features of the invention result from the following description of one preferred exemplary embodiment of the invention which is shown using the drawings, in which:

FIG. 3 shows an enlarged isometric illustration of the container receiving apparatus according to FIG. 1, FIG. 4 shows a plan view of the container receiving apparatus according to FIGS. 1 to 3, a receiving housing of the container receiving apparatus being removed from the center armrest, FIG. 7 shows a detail which is similar to FIG. 6, but from an opposite side.

DETAILED DESCRIPTION

Figure 1:
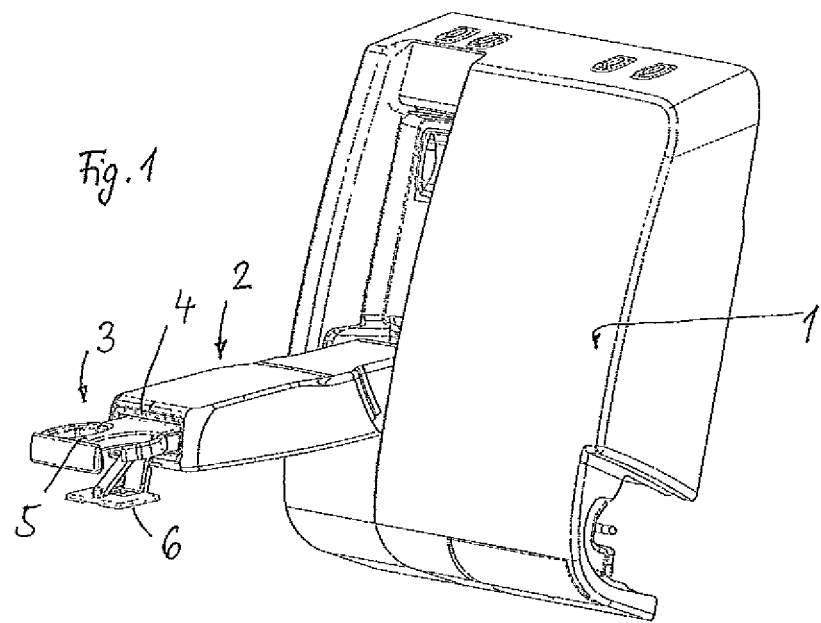
FIG. 1 shows one embodiment of a container receiving apparatus according to the invention which is integrated into a center armrest of a rear seat bench, in its functional position.
Figure 2:
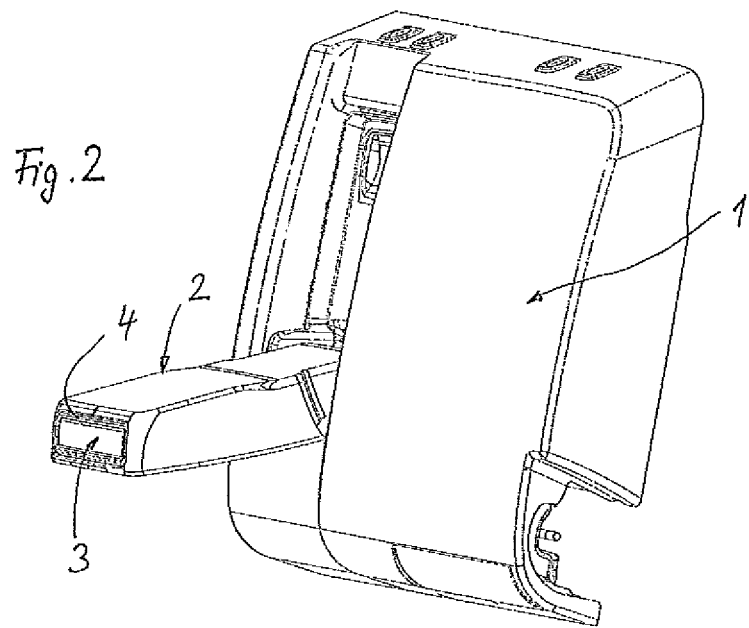
FIG. 2 shows the container receiving apparatus according to FIG. 1 in its rest position.

According to FIGS. 1 and 2, a vehicle interior of a passenger motor vehicle has a rear seat bench 1, of which merely part of a backrest arrangement is shown for reasons of clarity. The backrest arrangement of the rear seat bench 1 has a pivotable center armrest 2 in the region of its center. In an upwardly pivoted rest position, the center armrest 2 is lowered in a corresponding receptacle of the backrest arrangement and terminates substantially flush with a surface of the backrest arrangement. In the armrest position which is shown using FIGS. 1 and 2, the center armrest 2 is pivoted forward and downward into an approximately horizontal position, in which the center armrest 2 is held in a stable manner by way of corresponding stops.

A container receiving apparatus 3 is integrated into an end side of the center armrest 2 which protrudes toward the front in the driving direction of the passenger motor vehicle in the lowered armrest position. The container receiving apparatus 3 has a cassette-like receiving housing 4 which is inserted from the end side of the center armrest 2 into a corresponding cavity of the center armrest 2 and is locked in the center armrest 2.

A supporting frame 5 and a support base 6 of the container receiving apparatus 3 are mounted movably in the receiving housing 4. On the end side, the supporting frame 5 is provided with a panel which is not denoted in greater detail and brings about a visually flush termination of the container receiving apparatus 3 in the region of the front-side end side of the center armrest 2 as soon as the container receiving apparatus 3 is transferred into its integrated rest position (FIG. 2).

The extended functional position of the container receiving apparatus 3 is shown using FIG. 1. Said extended functional position is also shown once again on an enlarged scale using FIG. 3. The supporting frame 5 has two supporting ring units which are arranged next to one another and surround in each case one receiving opening for in each case one container. The supporting frame 5 can be displaced in a linearly movable manner within the receiving housing 4 between its extended functional position and its retracted rest position. A drive which can be configured as a mechanical spring motor is provided in the receiving housing 4 for displacing the supporting frame 5. Corresponding stops and locking elements within the receiving housing 4 secure the supporting frame 5 both in the extended functional position and in the retracted rest position.

Figure 5:
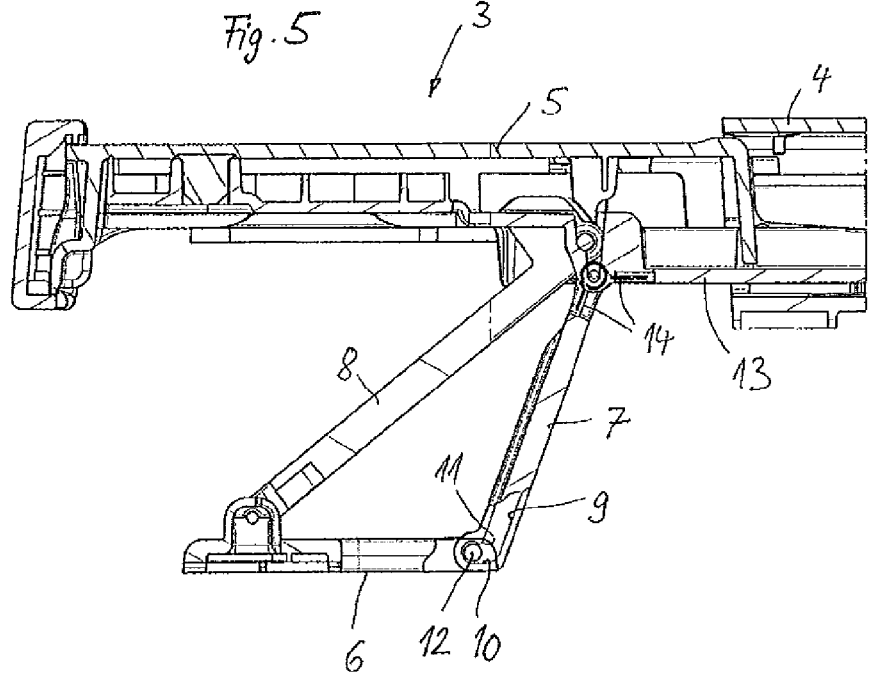
FIG. 5 shows an enlarged illustration of a section through the container receiving apparatus according to FIG. 4, along the sectional line V-V in FIG. 4.
Figure 6:
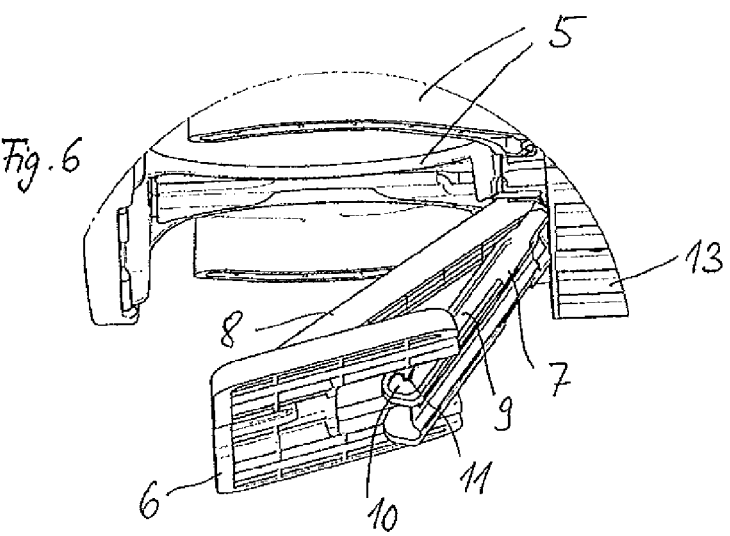
FIG. 6 shows a detail of the container receiving apparatus according to FIGS. 1 to 5 in an isometric illustration obliquely from below, the container receiving apparatus being situated in an intermediate position between the functional position and the rest position.

It can be seen using FIGS. 5 to 7 that the supporting frame 5 is arranged on an extending rail 13 which is mounted such that it can be displaced linearly in a telescopic manner in corresponding guide arrangements within the receiving housing 4.

In addition, pivoting kinematics 7, 8 for the support base 6 are arranged on the extending rail 13. The pivoting kinematics 7, 8 comprise a control arm 7 and a carrier arm 8. Both the control arm 7 and the carrier arm 8 are mounted on the supporting frame 5 and on the extending rail 13 such that they can be moved pivotably about pivot axes which are parallel to one another and extend in the vehicle transverse direction. The carrier arm 8 is connected to the support base 6 such that it can be moved pivotably at a bearing point in a front region of said support base 6.

The control arm 7 dips into a cutout of the support base 6, which cutout is open toward the rear, as can be seen using FIGS. 3, 6 and 7. The cutout is not denoted in greater detail. On its side faces which lie opposite one another, the control arm 7 has in each case one movement guide 9 which is designed as a groove which is open laterally to the outside, in which movement guide 9 in each case one sliding block 12 of the support base 6 is guided such that it can be displaced longitudinally. The movement guide 9 is open toward the rear and toward the top toward the extending rail 13. The two sliding blocks of the support base 6 are arranged in the region of the cutout and point inward toward one another, starting from opposite limbs of the cutout. Toward its front end which faces away from the extending rail 13, the movement guide 9 has an angled-away portion 10 which runs approximately at right angles toward the front, as can be gathered from FIGS. 5 to 7. In addition, in each case one latching cam 11 is provided in the region of the angled-away portion 10 within each movement guide 9, which latching cam 11 is arranged at an upper edge region of the movement guide 9 in the transition between the movement guide 9 and the angled-away portion 10.

The latching cam 11 which is designed as a supporting lug prevents it being possible for the sliding block 12 in the corresponding movement guide 9 to be moved back into the movement guide 9, after it has reached the front end of the angled-away portion 10 (see FIG. 5), during a pivoting movement of the support base 6 about its bearing point on the carrier arm 8. For this purpose, the latching cam 11 forms a rear engagement and rear support. The sliding block 12 can then be guided back into the movement guide 9 again only if it is first of all guided along parallel to the extent of the angled-away portion 10 in the region of the bottom of the angled-away portion 10, with the result that it is released from the latching cam 11. Accordingly, undesired pivoting movements of the support base 6 in the supporting functional position of the support base 6 according to FIG. 5 are avoided by way of the latching cam 11, which pivoting movements can occur about the pivot point of the carrier arm 8 relative to the support base 6 in the region of the bearing point of the carrier arm 8 on the support base 6.

A leg spring 14 (FIG. 5) acts on the control arm 7 in the region of its pivoting mounting relative to the extending rail 13 and relative to the supporting frame 5, which leg spring 14 loads the control arm 7 in the counterclockwise direction in accordance with the illustration according to FIG. 5. As a result, a corresponding torque is exerted in the counterclockwise direction on the control arm 7, which torque necessarily holds the sliding block 12 at the front end of the angled-away portion 10, since said front end of the angled-away portion 10 is always pulled against the sliding block 12 by way of the permanent torque of the control arm 7, which sliding block 12 is fixed to the support base 6 and is supported in a stable manner by the carrier arm 8.

As soon as the supporting frame 5 and the support base 6 are moved back out of the extended functional position according to FIG. 5 in the direction of their rest position again, the extending rail 13 retracts into the receiving housing 4, as a result of which the control arm 7 necessarily comes into contact with the edge of the receiving housing 4 and is pivoted upward counter to the force of the leg spring 14. As a result, the respective sliding block 12 can slide along toward the rear in the associated angled-away portion 10, as a result of which it dips through under the latching cam 11 and passes into the upwardly running linear region of the movement guide 9. As can be seen using FIGS. 6 and 7, the control arm 9, the support base 6 and the carrier arm 8 can then be pivoted upward during further retraction of the extending rail 13 into the receiving housing 4. The supporting frame 5 is designed in such a way that the support base 6, the control arm 7 and the carrier arm 8 can be pivoted upward as far as into the plane of the supporting frame 5, in which plane dipping of the entire movement unit comprising supporting frame 5, support base 6, control arm 7 and carrier arm 8 into the receiving housing 4 is made possible. In the case of a renewed extension operation, the spring force of the leg spring 14 necessarily again presses the control arm 7 in the direction of the downwardly pivoted functional position after the extension of the extending rail 13, as a result of which the carrier arm 8 and the support base 6 are also necessarily transferred into their functional position according to FIG. 5 again.

The invention claimed is:

1. A container receiving apparatus for a vehicle interior having an upper supporting frame which is provided for lateral support of at least one container, and a lower support base which is provided for bottom-side support of the container, the supporting frame being mounted in a receiving housing such that the supporting frame is movable linearly between a retracted rest position and an extended receiving position, the lower support base being mounted by a pivot arrangement such that the lower support base is movable between a supporting functional position and a rest position in which the lower support base is integrated into the receiving housing, wherein the pivot arrangement includes a blocking element which is active so as to limit movement of the lower support base in such a way that the lower support base is secured in the supporting functional position against unintentional upward pivoting.

2. The container receiving apparatus as claimed in claim 1, wherein the blocking element is active in a non-positive or positively locking manner.

3. The container receiving apparatus as claimed in claim 1, wherein the blocking element comprises at least one latching cam which is integrated into a movement guide of the pivot arrangement, is mechanically overridable, and cooperates with the lower support base to maintain the lower support base in the supporting functional position.

4. The container receiving apparatus as claimed in claim 3, wherein the movement guide is provided at one end with an angled-away portion in a transition region to the supporting functional position of the lower support base.

5. The container receiving apparatus as claimed in claim 4, wherein the at least one latching cam is disposed adjacent to the angled-away portion.

6. The container receiving apparatus as claimed in claim 4, wherein the pivot arrangement comprises a carrier arm and a control arm, the carrier arm and the control arm being pivotably movable about respective parallel pivot axes, and the carrier arm and the control arm act on the lower support base at a spacing from one another.

7. The container receiving apparatus as claimed in claim 6, wherein the movement guide, the angled-away portion and the at least one latching cam are integrated into the control arm.

8. The container receiving apparatus as claimed in claim 6, wherein the at least one latching cam is arranged in such a way that a pivoting movement of the lower support base relative to the carrier arm is prevented in the supporting functional position of the lower support base.

9. The container receiving apparatus as claimed in claim 6, wherein a spring arrangement acts on the control arm, the spring arrangement exerting a torque on the control arm in the direction of the supporting functional position of the lower support base.

\* \* \* \* \*